(12) United States Patent
Montone et al.

(10) Patent No.: US 8,733,826 B1
(45) Date of Patent: May 27, 2014

(54) TRUCK BED PANEL ATTACHED TO DOOR HINGE MOUNTING PLATE

(71) Applicants: Keith D Montone, Milford, MI (US); Steven T Houtman, South Lyon, MI (US); Anthony D Cavallo, Amerherstburg (CA); Pietro Gorlier, Birmingham, MI (US); James P Sassorossi, Oakland, MI (US)

(72) Inventors: Keith D Montone, Milford, MI (US); Steven T Houtman, South Lyon, MI (US); Anthony D Cavallo, Amerherstburg (CA); Pietro Gorlier, Birmingham, MI (US); James P Sassorossi, Oakland, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/718,350

(22) Filed: Dec. 18, 2012

(51) Int. Cl.
*B62D 25/02* (2006.01)
*B62D 27/00* (2006.01)

(52) U.S. Cl.
USPC ............. 296/193.04; 296/10; 296/183.1; 296/99.1; 29/401.1

(58) Field of Classification Search
USPC ............ 296/10, 181.3, 182.1, 183.1, 193.01, 296/193.04, 193.08, 99.1; 29/401.1
See application file for complete search history.

(56) References Cited

U.S. PATENT DOCUMENTS

| | | | | |
|---|---|---|---|---|
| 2,307,172 A | * | 1/1943 | Vanhooser | 296/35.1 |
| 2,816,794 A | * | 12/1957 | Temp | 29/401.1 |
| 4,842,326 A | | 6/1989 | DiVito | |
| 7,810,876 B2 | * | 10/2010 | Hedderly | 296/193.08 |

* cited by examiner

*Primary Examiner* — Dennis Pedder
(74) *Attorney, Agent, or Firm* — Ralph E Smith

(57) ABSTRACT

A conversion system that converts a four-door style vehicle into a pick-up style vehicle. The conversion system converts the four-door style vehicle into a pick-up style vehicle when rear doors of the vehicle are removed and replaced by inner and outer side panels that form a side panel assembly for the bed of the vehicle. Additional features of the conversion system include a bed floor assembly, a bulkhead assembly, and a roof assembly that isolate the cabin of the vehicle from the newly formed bed.

13 Claims, 5 Drawing Sheets

TRUCK BED PANEL ATTACHED TO DOOR HINGE MOUNTING PLATE

FIELD

The present disclosure relates to a truck bed panel attached to door hinge mounting plate.

BACKGROUND

Automotive conversion kits are commercially available where a vehicle may be altered in physical appearance; for example, conversion kits that change the aesthetic appearance of a vehicle to a more expensive looking vehicle. While some conversion kits change the aesthetic appearance of a vehicle, other conversion kits may change the functionality of a vehicle. For example, aftermarket tow packages, fenders, winch assemblies, and the like may be designed for particular vehicles, and then subsequently purchased by a consumer. It may be desirable, however, to completely change the functionality of a vehicle from, more or less, a passenger vehicle to a vehicle adapted to perform additional functions rather than just carrying passengers and light cargo.

SUMMARY

The present disclosure provides a conversion system that converts a four-door style vehicle into a pick-up style vehicle. The conversion system converts the four-door style vehicle into a pick-up style vehicle when rear doors of the vehicle are removed and replaced by inner and outer side panels that form a side panel assembly for the bed of the vehicle. Additional features of the conversion system include a bed floor assembly, a bulkhead assembly, and a roof assembly that isolate the cabin of the vehicle from the newly formed bed.

Further areas of applicability of the present disclosure will become apparent from the detailed description provided hereinafter. It should be understood that the detailed description, including disclosed embodiments, drawings and claims are merely exemplary in nature intended for purposes of illustration only and are not intended to limit the scope of the invention, its application or use. Thus, variations that do not depart from the gist of the invention are intended to be within the scope of the invention.

DRAWINGS

DETAILED DESCRIPTION

Figure 1:
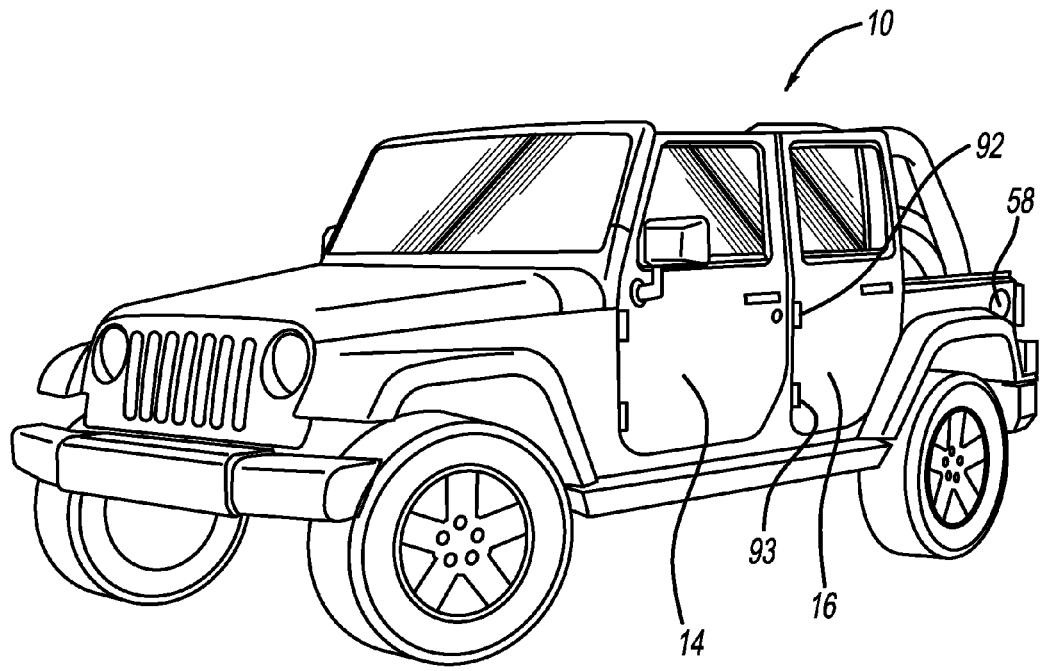
FIG. 1 illustrates a perspective view of a four-door style passenger vehicle.
Figure 2:
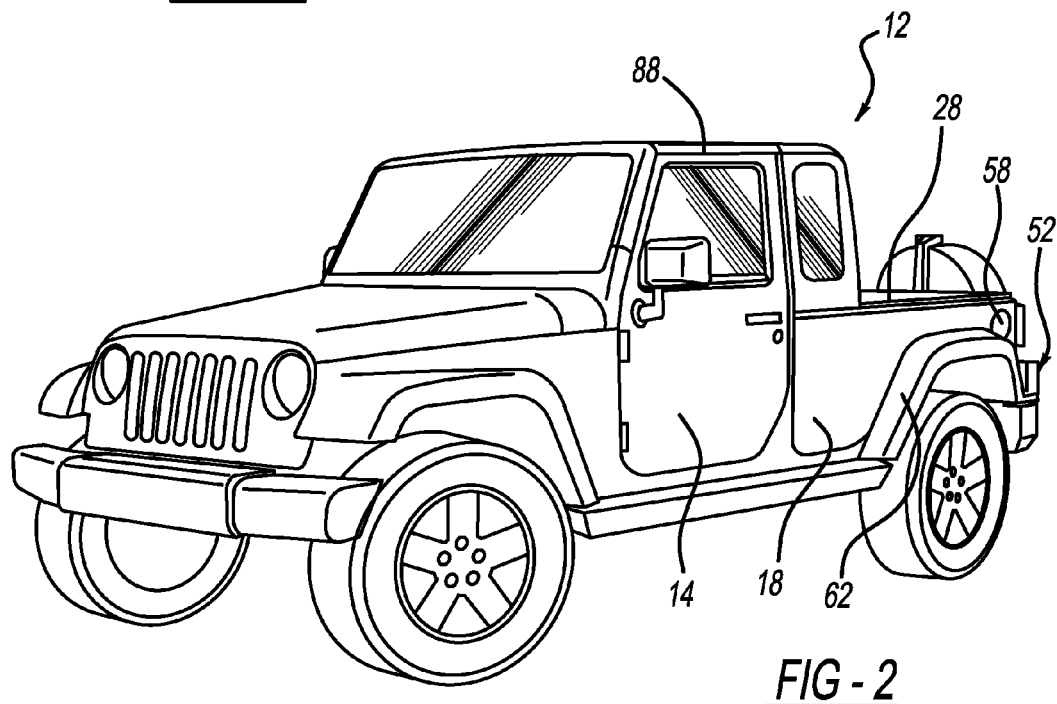
FIG. 2 illustrates a perspective view of the four-door style vehicle of FIG. 1 converted into a pick-up style vehicle after being outfitted with the conversion system according to the present disclosure.

FIG. 1 illustrates a four-door vehicle 10 that may be converted into a pick-up style vehicle 12 (FIG. 2), according to a principle of the present disclosure. Vehicle 10 includes front doors 14 and rear doors 16. To convert vehicle 10 into pick-up style vehicle 12, rear doors 14 will be removed and replaced by side panels 18, as will be described in more detail below. As can be seen in FIG. 2, rear doors 16 have been removed and replaced by side panel assemblies 18. Vehicle 12, therefore, may now function as a pick-up style vehicle.

Figure 3:
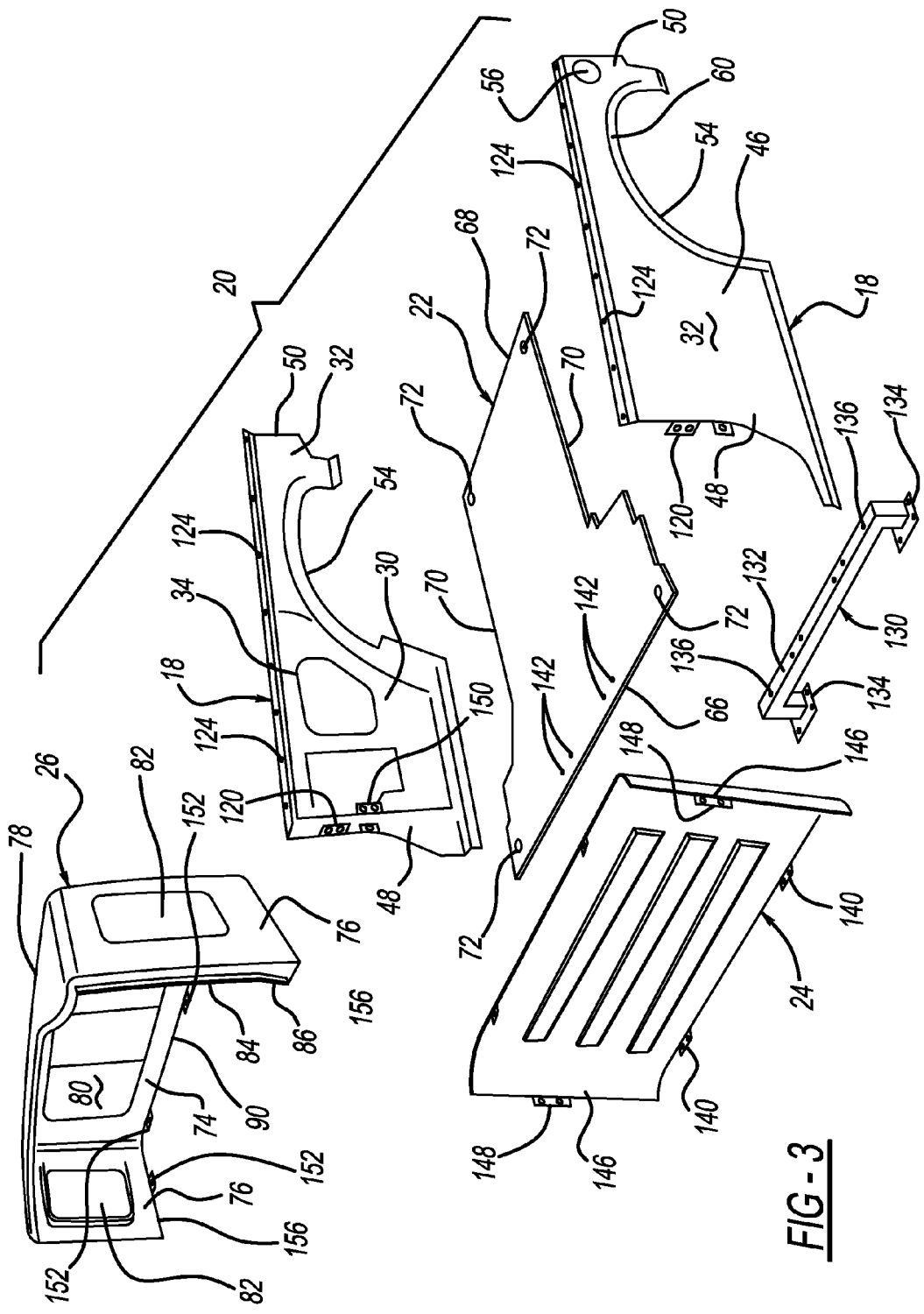
FIG. 3 illustrates various side panel assemblies, a bed floor assembly, a bulkhead assembly, and a roof assembly of the conversion system according to a principle of the present disclosure.

FIG. 3 illustrates a conversion system 20 that converts vehicle 10 into pick-up style vehicle 12 according to the present disclosure. Conversion system 20 includes a pair of side panel assemblies 18, a bed floor assembly 22, a bulkhead assembly 24, and a roof assembly 26. As noted above, side panel assemblies 18 can be used to replace rear doors 16. As the rear seats of vehicle 10 may also be removed, bed floor assembly 22 can be secured in the rear of vehicle 10 to provide a planar surface in the bed 28 of pick-up style vehicle 12. Similarly, as rear seats of vehicle 10 can be removed, no barrier between bed 28 and the front seats of the vehicle 12 will be present. Accordingly, bulkhead assembly 24 can be placed directly behind the front seats to provide a barrier between the cabin of vehicle 12 and bed 28. Roof assembly 26 is mountable to bulkhead assembly 24 to completely enclose the cabin of vehicle 12.

Figure 4:
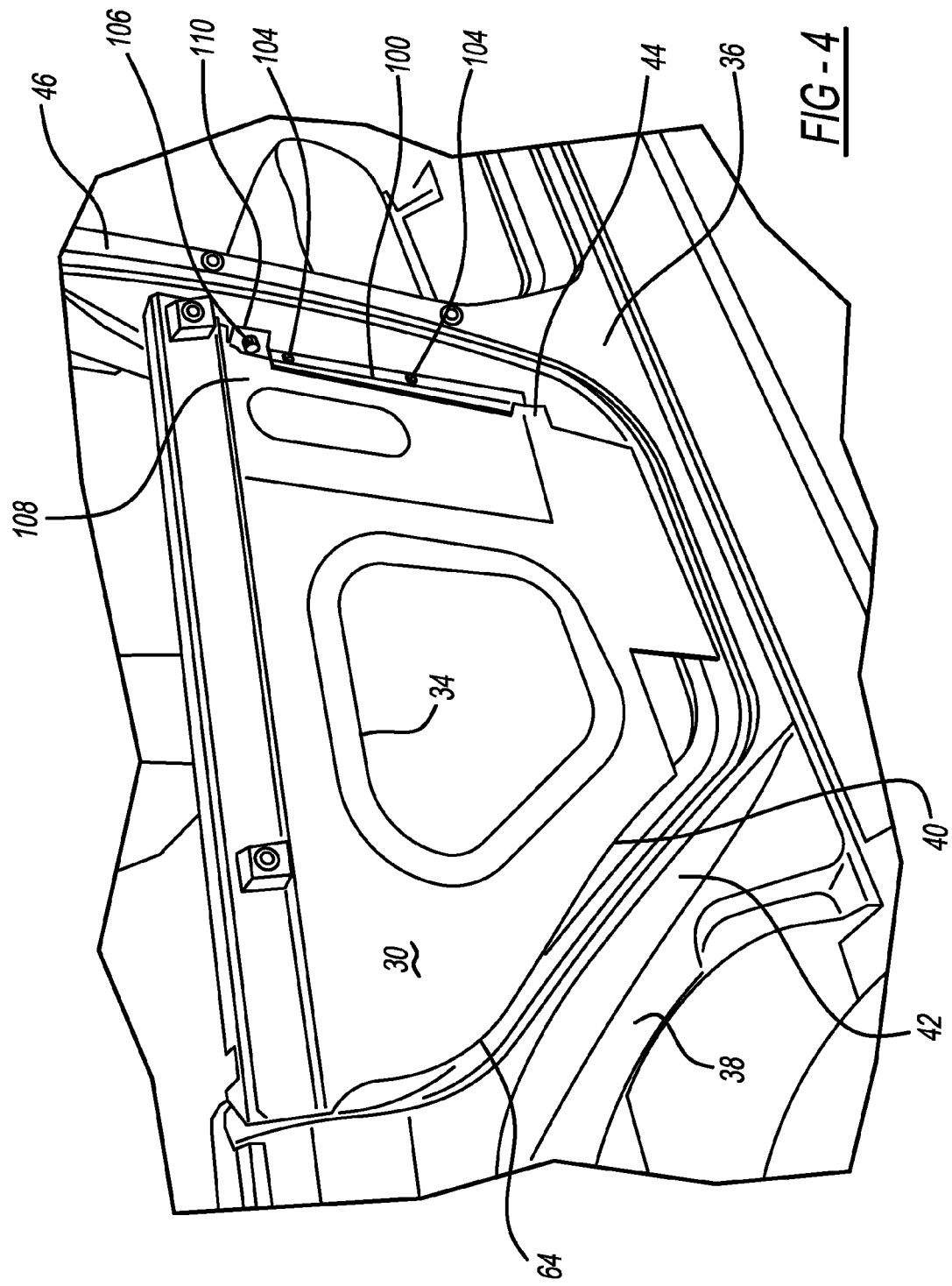
FIG. 4 illustrates an inner panel of the side panel assembly mounted to the vehicle according to a principle of the present disclosure.

Side panel assemblies 18 can include an inner panel 30 and an outer panel 32. Referring to FIG. 4, when mounting side panel assemblies 18 to vehicle 10, inner panel 30 can first be mounted where rear doors 16 were previously located, and then outer panels 32 can be mounted to inner panels 30. Inner panels 30 may act as a reinforcement section that provides structural rigidity to side panel assemblies 18, and generally face toward an interior of bed 28. In this regard, inner panels 30 can include structural members 34 integral therewith or welded thereto that structurally increase rigidity of side panel assemblies 18 in the event of a side impact during operation of vehicle 12. Structural members 34 can be formed of material having increased thickness relative to a thickness of inner panels 30 or, alternatively, structural members can be hollow members that house reinforcing fillers such as glass-filled plastics that are injection molded to correspond to a shape of structural members 34. Regardless, it should be understood that side panel assemblies 18 should provide sufficient rigidity to vehicle 12 in the event of a side-impact that complies with the applicable regulations mandated by law.

Inner panels 30 are shaped to correspond to a shape of vehicle body 36. In this regard, when rear doors 16 are removed, vehicle body 36 is contoured to account for wheel wells 38. Inner panels 30, therefore, can also be contoured at end 40 to correspond to the contours 42 of vehicle body 36 where wheel wells 38 are located. At an end 44 opposite to end 40, inner panel 30 is substantially linear in shape to correspond to B-pillar 46 of vehicle body 36. Inner panel 30 being linear at end 44 provides a beneficial location to mount inner panel 30 to vehicle body 36, as will be described in more detail below.

Outer panel 32 mounts to inner panel 30, and serves to improve the aesthetic appearance of vehicle 12 when side panel assemblies 18 are installed to convert vehicle 10 into pick-up style vehicle 12. That is, decorative section 32 is designed to make vehicle 12 appear that it was originally manufactured as a pick-up style vehicle. Decorative section 32, therefore, includes a painted and polished outer surface 46 that can be coordinated with the original color of vehicle 10.

Outer panel 32 includes a first portion 48 that mounts to and covers inner panel 30, and also includes a second portion 50 that extends outward from first portion 48 towards a rear 52 of vehicle 12. Second portion 50 is contoured at 54 to account for wheel wells 38, and second portion 50 has a length that extends to rear 52 of vehicle 12. Second portion 50 is provided, as noted above, to provide an aesthetically pleasing appearance that makes it appear that vehicle 12 was originally manufactured in this state. In other words, outer panel 32 is dimensioned so that no seam lines appear between vehicle body 36 and side panel assemblies 18. Accordingly, second portion 50 can include an aperture 56 that provides for access to fuel cap 58.

As illustrated in FIG. 3, outer panels 32 can optionally include recesses 60 at contours 54. Recesses 60 provide for fender flares 62 to be mounted to side panel assemblies 18, if desired. It should be understood, however, that fender flares 62 are optional features, and outer panels 32 do not necessarily include recesses 60.

To provide a weather-proof seal between inner panels 30 and vehicle body 36, a seal (not shown) formed of a material such as, for example, ethylene-diene monomer (EPDM) can be disposed along peripheral edges 64 of inner panel 30. In addition, a seal (not shown) can be disposed between inner panel 30 and outer panel 32 to prevent water and debris that may cause corrosion from entering the interface between inner panel 30 and outer panel 32.

Bed floor assembly 22 is a substantially planar member that may be formed of a sheet metal material such as steel or aluminum. Alternatively, bed floor assembly 22 can be formed of rigid plastic materials such as nylon, polystyrene, or any other type of rigid plastic known to one skilled in the art. Bed floor assembly 22 provides pick-up style vehicle 12 with a planar bed similar to that of a regular pick-up style truck. More particularly, when rear seats of vehicle 10 are removed, a non-planar floor of the bed of vehicle 12 will remain due to the absence of the rear seats. Bed floor assembly 22, therefore, provides the bed of pick-up style vehicle 12 with an entirely planar surface.

As illustrated in FIG. 3, bed floor assembly 22 includes a first end 66 that will lie adjacent the front seats of pick-up style vehicle 12, and a second end 68 that will lie adjacent the rear of pick-up style vehicle 12. Between first end 66 and second end 68 are cut-outs 70 that account for wheel wells 38. To secure bed floor assembly 22 to the bed of pick-up style vehicle 12, bed floor assembly 22 includes through holes 72 for fastening bed floor assembly 22 to body 36 of vehicle 12 with fasteners (not shown).

When vehicle 10 is converted into pick-up style vehicle 12, no barrier will be present between the front seats and the bed. Accordingly, conversion system 20 can additionally include bulkhead assembly 24 that will provide a barrier between the bed and the cabin of pick-up style vehicle 12. Similar to bed floor assembly 22, bulkhead assembly 24 may be formed of sheet metal materials such as steel or aluminum. Alternatively, bulkhead assembly may be formed of rigid plastic materials such as nylon, polystyrene, or any other type of material deemed suitable by one skilled in the art.

To enclose cabin of pick-up style vehicle 12 can also include a roof assembly 26. Roof assembly 26 includes a rear panel 74, side panels 76, and a top panel 78. Rear panel 74 can include a rear window 80, while side panels 76 can include side windows 82. As illustrated in FIG. 2, roof assembly 26 includes a flange 84 along an entire surface 86 that will abut the B-pillars 46 and existing roof 88. Similar to side panel assemblies 18, flange 84 can include a seal (not shown) thereon that seals the interface between roof assembly 26, B-pillars 46, and existing roof 88. Additionally, a seal (not shown) may exist at edge 90 of roof assembly 26 to seal the interface between roof assembly 26 and bulkhead assembly 24.

Now, the installation process of conversion system 20 to convert vehicle 10 will be described. At the outset, rear doors 16 should be removed from vehicle 10. After rear doors 16 have been removed, the rear seats should be removed along with upper and lower hinges 92 and 93 from each B-pillar 46. As a pair of fasteners (not shown) are generally used to secure upper and lower hinges 92 and 93 to B-pillar 46, when hinges 92 are removed from B-pillars 46, a pair of through holes 95 and 97 at each hinge location will be exposed on B-pillar 46 after upper and lower hinges 92 and 93 are removed. The exposed through holes 95 and 97 may then be used as a fastening point to secure side panel assemblies 18 to vehicle body 36.

More particularly, to secure side panel assemblies 18 to vehicle body 36, a mounting bracket assembly 94 (FIG. 5) is secured to each of B-pillars 46. As illustrated in FIG. 4, mounting bracket assemblies 94 are substantially elongate members having a length that extends between the locations previously occupied by hinges 92. In this regard, mounting bracket assemblies 94 include a primary mounting surface 96 that faces B-pillar 46 and includes apertures (not shown) where fasteners 98 can be used to secure mounting bracket assembly 94 to B-pillar 56. Specifically, fasteners 98 can be used to secure mounting bracket assembly 94 to through hole 97 of upper hinge 92 and to through hole 95 of lower hinge 93, thus leaving at least through hole 95 of upper hinge 92 exposed. Extending substantially orthogonal to mounting surface 96 is a flange 100 that acts as a mounting surface for inner panel 30.

To secure inner panel 30 to mounting bracket assembly 94, flange 100 that acts as a mounting surface for inner panel 30 includes apertures 102 that receive fasteners 104 that secure end 44 of inner panel 30 to mounting bracket assembly 94. Inner panel 30 also includes a first lip flange 106 at an upper location 108 that corresponds to through hole 95 of upper hinge 92. A fastener 110 can then secure lip flange (and thus inner panel 30) directly to B-pillar 46 of vehicle body 36. Mounting bracket assembly 94, however, ensures proper alignment of inner panel 30 relative to B-pillar 46 and vehicle body 36.

Figure 5:
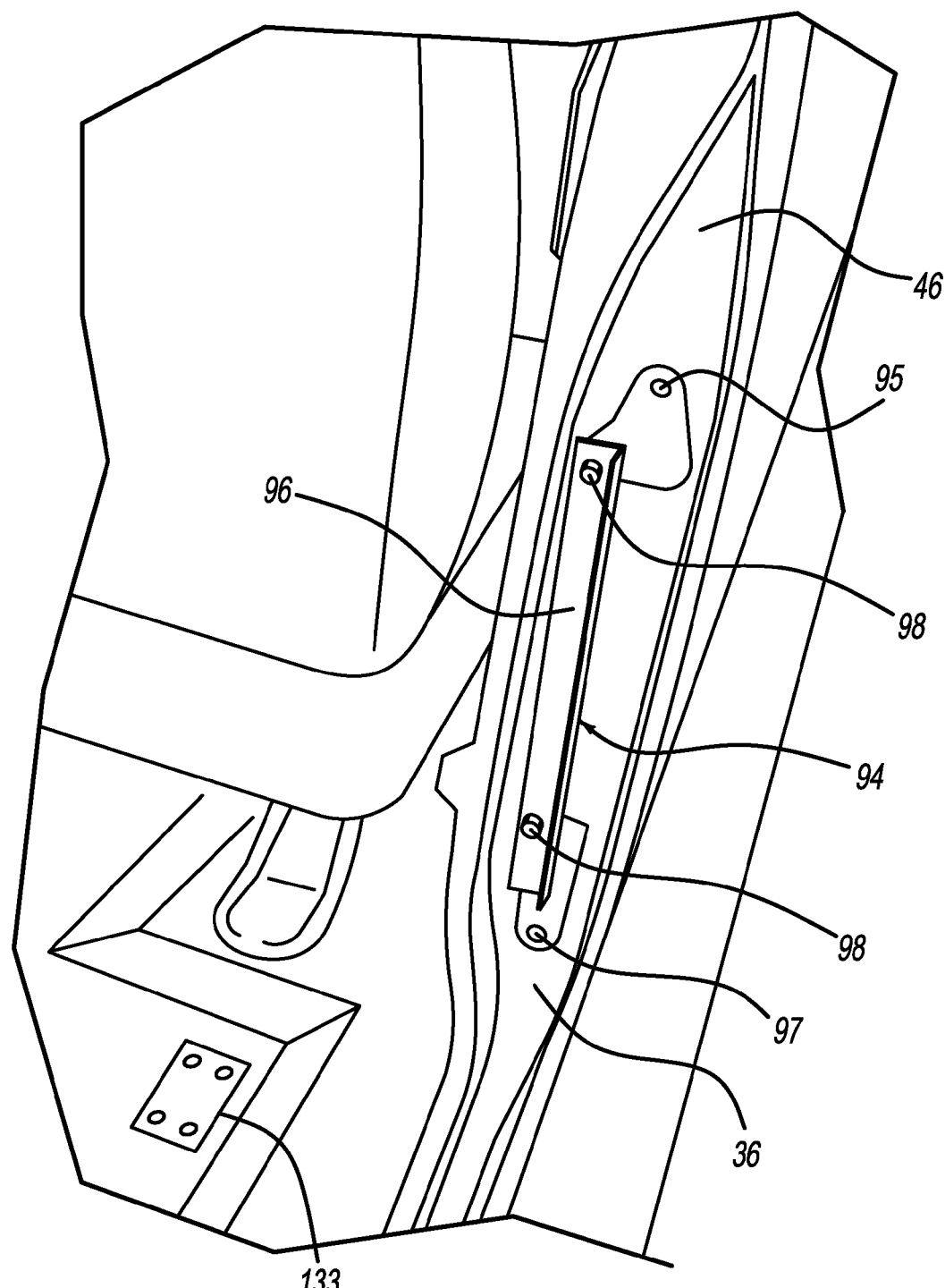
FIG. 5 illustrates a mounting bracket assembly utilized to mount a first end of the inner panel to the vehicle.
Figure 6:
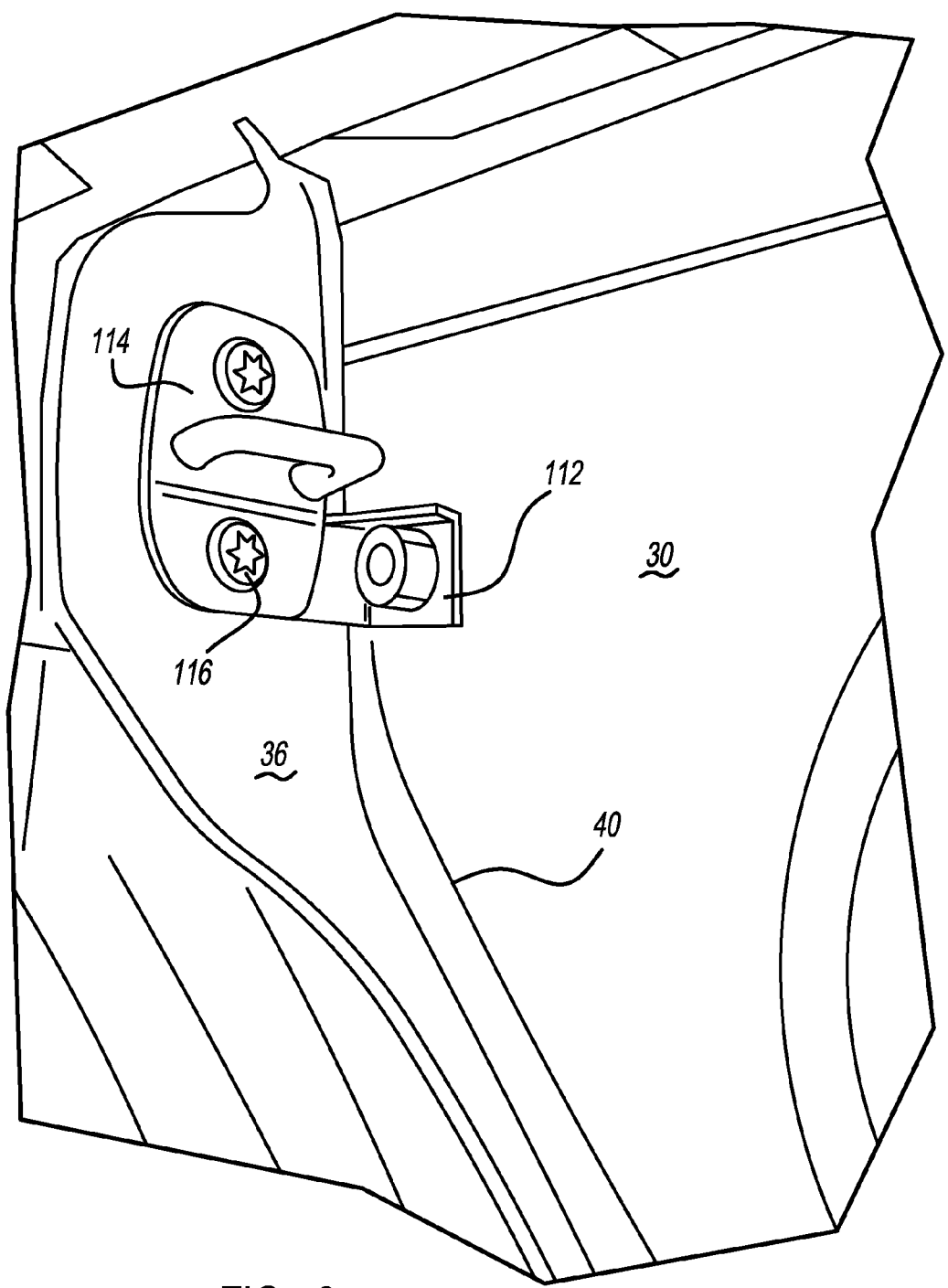
FIG. 6 illustrates a mounting arrangement utilized to mount a second end of the inner panel to the vehicle.

To mount end 40 of inner panel 30 to vehicle body 36, inner panel 30 can include a second lip flange 112 (FIG. 6). In a manner similar to first lip flange 106, second lip flange 112 can be used to secure inner panel 30 to vehicle frame 36 at a location where hardware, in this case a latching hook 114, is no longer required due to the removal of rear doors 16. As illustrated in FIG. 5, latching hook 114 does not necessarily need to be entirely removed from vehicle body 36 and replaced by second lip flange 112. Rather, latching hook 114 can be removed from vehicle body 36, and then the lip flange 112 can be disposed between latching hook 114 and vehicle body 36 whereupon latching hook 114 is re-secured to vehicle 36. Although only a single second lip flange 112 is illustrated in FIG. 5, it should be understood that a pair of second lip flanges 112 may be used to make use of each fastening point 116 where latching hook 114 is secured to vehicle body 36. Alternatively, second lip flange 112 may include a pair of apertures (not shown) that correspond to each fastening point 116 used to secure latching hook 114 to vehicle body 36.

After inner panels 30 have been secured to vehicle body 36, outer panels 32 may be secured over inner panels 30 and vehicle body 36. In this regard, outer panel 32 can include first and second attachment flanges 120 and 122 at first portion 48 that can secure outer panel 32 to through hole 95 and through hole 97, respectively, where hinges 92 were formerly located. First attachment flange 120 may secured to through hole 95, with first lip flange 106 located between through hole 95 and attachment flange 120, by fastener 110. Securing outer panel 32 at through holes 95 and 97 with first and second attachment flanges 120 and 122 ensures that first portion 48 of outer panel 32 is robustly secured to body 36.

To secure second end 50 of outer panel 32 to body 36, outer panel 32 can include apertures 124 where outer panel 32 can be secured to body 36 by rivets (not shown). Securing outer panel 32 to body 36 using rivets ensures that outer panel 32 cannot be removed from body 36 without sufficient effort that negates theft of outer panel 32. In addition, it should be understood that rivets (not shown) can also be used to secure outer panel 32 to inner panel 30. Securing outer panel 32 to inner panel 30 in this manner increases the structural rigidity between outer panel 32 and inner panel 30 that assists in increasing the durability of side panel assemblies 18 in the event of a side-impact.

Before or after inner panels 30 and outer panels 32 have been installed, but after the rear seats have been removed from the vehicle, floor bed assembly 22 can be installed. To secure floor bed assembly 22 to body 36, as noted above, bed assembly 22 includes through holes 72 that receive fasteners (not shown). It should be understood, however, that when rear seats of the vehicle 10 are removed, the floor of the vehicle 10 will not be substantially planar. To further assist in securing floor bed assembly 22 to body 36 of vehicle 10, therefore, conversion system 20 can also include a cross-bar support member 130.

Cross-bar support member 130 includes a support bar 132 connected to foot pads 134 that can be secured to locations 133 where the rear seats were previously fixed. Support bar 132 can also include apertures 136 that correspond to apertures 72 of floor bed assembly 22. Fasteners (not shown) in the form of bolts or screws can be used to secure floor bed assembly 22 to cross-bar support member 130. As support bar 132 is elevated relative to foot pads 134, the non-planar bed of vehicle 10 that remains when the rear seats are removed is negated. In this manner, floor bed assembly 22 can now be reliably secured to vehicle body 36 through cross-bar support member 130 to provide a substantially planar bed for converted vehicle 12.

After bed floor panel assembly 26 has been installed, bulkhead assembly 24 is installed. To install bulkhead assembly 24, bulkhead assembly 24 is a substantially planar member that includes tabs 140 for securing bulkhead assembly 24 to floor assembly 22 at apertures 142. Support bar 132 can also include apertures 144 such that in addition to securing bulkhead assembly 24 to floor assembly 22, bulkhead assembly 24 can be rigidly secured to support bar 132. At peripheral edges 146 can also be formed side tabs 148 that can be coupled to side panel assemblies 18 at coupling 150 using fasteners (not shown). Also, it should be understood that a sealant or adhesive (not shown) can be disposed about peripheral edges 146 to provide a weather-proof seal between side panel assemblies 18 and bulkhead assembly 24.

After bulkhead assembly 24 is installed, roof assembly 26 is installed and secured to bulkhead assembly 24 and side panel assemblies 18. In this respect, roof assembly 26 includes brackets 152 that secure roof assembly 26 to bulkhead assembly 24 and outer panel 32 of side panel assemblies 18. Brackets 152 at edge 90 correspond to brackets 154 formed on bulkhead assembly 24. Brackets 152 at edges 156 may be coupled to apertures 124 of outer panel 32. In this manner, roof assembly 26 can be rigidly secured to bulkhead assembly 24 and side panel assemblies 18. Once roof assembly 26 is coupled to bulkhead assembly 24 and side panel assemblies 18, completion conversion of the 4-door style vehicle 10 into a pick-up style vehicle 12.

What is claimed is:

1. A method for converting a four-door vehicle into a pick-up style vehicle, comprising:
    removing rear doors of the four-door vehicle;
    removing hinges that mounted the rear doors to the four-door vehicle;
    securing a bracket at a location previously occupied by the removed hinges; and
    mounting side-panel assemblies at positions previously occupied by the rear doors,
    wherein the side-panel assemblies are mounted to the bracket.

2. The method of claim 1, further comprising securing the side-panel assemblies to a latch bracket of the four-door vehicle.

3. The method of claim 1, further comprising removing rear seats of the four-door vehicle; and
    mounting a cross-bar assembly at the location previously occupied by the rear seats.

4. The method of claim 3, further comprising mounting a floor assembly to the cross-bar assembly.

5. The method of claim 3, further comprising securing a bulkhead assembly at a position previously occupied by the rear seats.

6. The method of claim 5, wherein the bulkhead assembly is secured to the cross-bar assembly.

7. The method of claim 5, further comprising securing a roof assembly to the bulkhead assembly.

8. A conversion kit for converting a four-door vehicle into a pick-up style vehicle, the four-door vehicle including a pair of rear doors supported on the four-door vehicle by rear-door hinges, comprising:
    a pair of mounting brackets operable to be secured to the rear-door hinges of the four-door vehicle;
    a pair of side panel assemblies operable to be secured to the mounting brackets;
    a floor assembly; and a
    bulkhead assembly.

9. The conversion kit of claim 8, wherein the side panel assemblies each include an inner panel and an outer panel.

10. The conversion kit of claim 8, wherein the bulkhead assembly includes a roof assembly.

11. The conversion kit of claim 8, wherein the side panel assemblies are operable to be secured to a latch mechanism of the rear doors.

12. The conversion kit of claim 8, wherein side-panel assemblies each include a structural support feature.

13. The conversion kit of claim 8, wherein the floor assembly couples to cross-bar support member.

* * * * *